(12) United States Patent
Prathipati et al.

(10) Patent No.: US 12,420,931 B2
(45) Date of Patent: Sep. 23, 2025

(54) TRAY TABLE WITH INTEGRATED STOWAGE POUCH FOR TRAVEL ESSENTIALS

(71) Applicant: B/E Aerospace, Inc., Winston-Salem, NC (US)

(72) Inventors: Krishna Chaitanya Prathipati, Hyderabad (IN); Ravindra Ramulu Kandukuri, Secunderabad (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 158 days.

(21) Appl. No.: 18/233,563

(22) Filed: Aug. 14, 2023

(65) Prior Publication Data
US 2024/0336361 A1 Oct. 10, 2024

(30) Foreign Application Priority Data
Apr. 10, 2023 (IN) .............................. 202311026606

(51) Int. Cl.
*B64D 11/06* (2006.01)
(52) U.S. Cl.
CPC ...... *B64D 11/0638* (2014.12); *B64D 11/0627* (2014.12)
(58) Field of Classification Search
CPC ................................................ B64D 11/0627
USPC ............................................ 297/163; 108/90
See application file for complete search history.

(56) References Cited

U.S. PATENT DOCUMENTS

| | | | |
|---|---|---|---|
| 2,078,839 A * | 4/1937 | Conant | A21C 3/021 |
| | | | 108/90 |
| 2,637,136 A * | 5/1953 | Mark | A63F 1/06 |
| | | | 108/90 |
| 3,295,577 A * | 1/1967 | Danielson | A47B 13/086 |
| | | | 5/923 |
| 3,310,091 A * | 3/1967 | Geisen | A47G 11/004 |
| | | | 108/90 |
| 3,557,856 A * | 1/1971 | Berman | A63F 1/06 |
| | | | 108/26 |
| 6,240,667 B1 * | 6/2001 | Harney | G09F 21/049 |
| | | | 108/90 |

(Continued)

FOREIGN PATENT DOCUMENTS

| | | |
|---|---|---|
| CN | 203314293 U | 12/2013 |
| EP | 0045236 B1 | 2/1985 |

(Continued)

OTHER PUBLICATIONS

European Patent Office, Extended European Search Report received in EP Application No. 24168545.2, Aug. 6, 2024, 10 pages.

*Primary Examiner* — Jose V Chen
(74) *Attorney, Agent, or Firm* — Suiter Swantz IP

(57) ABSTRACT

The present disclosure provides a tray table assembly including a pouch configured to temporarily stow travel essentials during flight. The pouch is removably attached to the back of the tray table by way of a plurality of removable fasteners. The pouch includes inner and outer layers forming an interior space therebetween accessible through a top opening that may be zippered or otherwise closeable. In some embodiments, the pouch is constructed from soft material such as neoprene rubber, and at least the outer layer is made from mesh or translucent material such that the contents are visible to the passenger, so they are not forgotten and left behind.

14 Claims, 6 Drawing Sheets

(56) References Cited

U.S. PATENT DOCUMENTS

| | | | |
|---|---|---|---|
| 7,104,201 B2* | 9/2006 | Comeaux | A61B 50/13 108/90 |
| 7,841,658 B1* | 11/2010 | Marble | B60N 2/60 297/229 |
| D677,966 S * | 3/2013 | Natkin | D6/611 |
| D705,581 S * | 5/2014 | Luczak | D6/611 |
| 8,936,307 B2 | 1/2015 | Heredia | |
| 8,936,308 B2 | 1/2015 | Petersen et al. | |
| 9,051,087 B1* | 6/2015 | Daniels | B60N 3/004 |
| 9,295,603 B1* | 3/2016 | Selnow | A47G 11/004 |
| 9,643,727 B2* | 5/2017 | Dall'Era | B64D 11/06 |
| 10,836,284 B1* | 11/2020 | Mizera | A47G 11/004 |
| 11,925,282 B2* | 3/2024 | Westhoven | A47G 11/004 |
| 2001/0039903 A1* | 11/2001 | Patterson | B60N 3/004 108/44 |
| 2006/0102667 A1 | 5/2006 | Padilla | |
| 2007/0114143 A1* | 5/2007 | Miskin | B60N 3/002 206/217 |
| 2011/0297498 A1 | 12/2011 | Yu | |
| 2013/0220185 A1* | 8/2013 | Valenta | B65D 65/10 108/90 |
| 2014/0014006 A1* | 1/2014 | Clatterbuck | A47G 23/0303 108/90 |
| 2014/0077533 A1* | 3/2014 | Shih | B60N 3/004 297/163 |
| 2014/0167457 A1* | 6/2014 | Schultheis | B64D 11/0627 297/162 |
| 2014/0377499 A1* | 12/2014 | Davino | B64D 11/0638 428/99 |
| 2015/0108798 A1* | 4/2015 | Boyer, Jr. | B60R 11/0252 297/188.05 |
| 2015/0111626 A1* | 4/2015 | Bell | H04M 1/11 455/575.8 |
| 2015/0122159 A1* | 5/2015 | Valcic | B60R 7/043 108/26 |
| 2017/0071375 A1* | 3/2017 | Smith | B64D 11/0638 |
| 2017/0291710 A1* | 10/2017 | Barr-Perea | B61D 33/0007 |
| 2021/0145193 A1* | 5/2021 | Presley | B60N 3/004 |

FOREIGN PATENT DOCUMENTS

| | | | | |
|---|---|---|---|---|
| EP | 2582579 B1 * | 8/2017 | | B60N 3/004 |
| WO | WO-2011160032 A1 * | 12/2011 | | B60N 3/004 |

* cited by examiner

TRAY TABLE WITH INTEGRATED STOWAGE POUCH FOR TRAVEL ESSENTIALS

CROSS-REFERENCE AND INCORPORATION BY REFERENCE

This nonprovisional patent application claims the benefit of priority of Indian Provisional Patent Application. No. 202311026606 filed Apr. 10, 2023, which is hereby incorporated by reference in its entirety.

TECHNICAL FIELD AND BACKGROUND

The present disclosure relates generally to stowage solutions for passenger cabins, and more particularly, to an economy class tray table including an integrated pouch for stowing travel essentials in a conspicuous manner.

Passenger cabins suffer from a lack of stowage space, particularly in economy seating classes. In aircraft, stowage space is typically limited to overhead bins, under seat space, and literature pockets. While overhead bins and under seat space are able to accommodate larger items such as luggage, bags, coats, etc., small items stowed in these spaces tend to be forgotten and left behind when passengers deplane. As for the literature pocket, these pockets are typically formed from the dress cover or shroud material of the seat and are already tasked with holding safety card instructions and magazines. Importantly, except for a portion of taller items, most contents stowed within a literature pocket are not visible from the outside. Thus, storing smaller items in literature pockets presents the risk that such items will also be forgotten and left behind.

Therefore, what is needed is a conspicuous stowage solution for essential travel items such as smartphones, passports, wallets, boarding passes, etc.

BRIEF SUMMARY

To achieve the foregoing and other advantages, according to a first aspect, the present disclosure provides a tray table assembly including a tray table configured to stow against a seat back and deploy away from the seat back, and a pouch removably attached to the back of the tray table by a plurality of removable fasteners. The back of the pouch is formed by a first layer positioned against the back of the tray table. The front of the pouch is formed by a second layer positioned against the first layer. An interior space for holding smaller items is formed between the first layer and the second layer. The top of the pouch is formed by a closeable opening, and the bottom of the pouch is formed by an expandable fold.

In some embodiments, the second layer includes mesh such that contents in the interior space are visible through the second layer.

In some embodiments, the tray table includes a plurality of openings formed on the back of the tray table with each opening positioned proximate a corner of the tray table, the first layer of the pouch includes a plurality of openings formed through the first layer, wherein the plurality of openings formed through the first layer correspond in number and position to the plurality of openings formed through the back of the tray table, and the plurality of removable fasteners are rivets, each rivet received through one of the plurality of openings formed through the first layer and the corresponding one of the plurality of openings formed through the back of the tray table, wherein the rivets are accessible from within the interior space.

In some embodiments, the top of the pouch includes a zippered opening or other fastener configured to maintain the top opening closed.

In some embodiments, the top of the pouch includes corner covers positioned over respective top corners of the tray table.

In some embodiments, at least a portion of the pouch is made from neoprene rubber.

In some embodiments, the tray table and the pouch are substantially equally sized.

In some embodiments, the second layer includes a flexible interior portion and a rigid border.

In some embodiments, the second layer is translucent or transparent such that contents in the interior space are visible through the second layer.

In a further aspect, the present disclosure provides a pouch configured to be removably attached to a tray table having a front, a back, a top, a bottom, and opposing lateral sides, the tray table configured to stow against a seat back and deploy away from the seat back. The pouch has a front, a back, a top, a bottom, and opposing lateral sides. The back of the pouch is formed by a first layer configured to be positioned against the back of the tray table. The front of the pouch is formed by a second layer positioned against the first layer. An interior space is formed between the first layer and the second layer. The top of the pouch is formed by a closeable opening. The bottom of the pouch is formed by an expandable fold.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
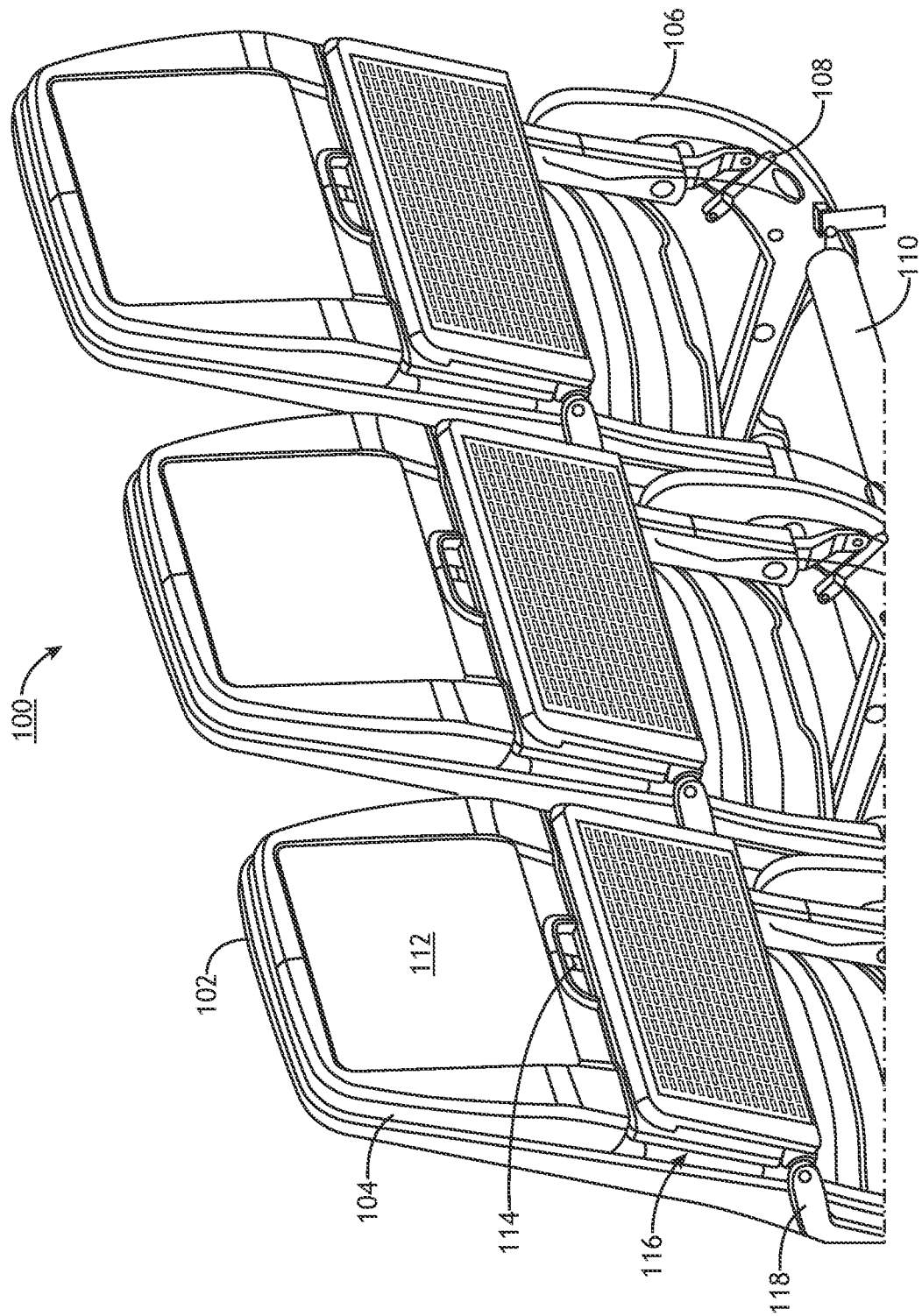
FIG. 1 is a perspective view of a seat row including a plurality of passenger seats each including a tray table assembly according to an embodiment of the present disclosure.

Before explaining embodiments of the inventive concepts disclosed herein in detail, it is to be understood that the inventive concepts disclosed herein are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, where applicable, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Broadly, the present disclosure provides a tray table assembly for a passenger seat generally including a tray table and an attached stowage pouch, and a stowage pouch configured to be removably attached to a tray table. The pouch removably attaches to the back or bottom of the tray table such that the pouch is in direct line of sight of the passenger when the tray table is in a stowed condition. At least the outer layer of the pouch is mesh, transparent, or translucent such that items stowed in the pouch (e.g., smartphone, passport, boarding pass) are conspicuous to remind the passenger to remove the items when deplaning. The pouch is dimensioned to hold smaller items, for instance items having a thin profile, that are commonly brought onboard by passengers. The pouch is constructed from soft material to satisfy impact criteria for passenger seats. The pouch may include a closeable opening such that items are secured in the pouch regardless of the position of the tray table.

FIG. 1 illustrates a non-limiting example of a seat row 100, such as an economy class seat row found in an aircraft passenger cabin. As shown for context, the seat row 100 includes three laterally adjacent passenger seats 102. The seat row 100 may include any number of passenger seats, such 1, 2, 3 . . . n seats. Each passenger seat 102 includes a seat back 104 supported by a seat frame 106, wherein the seat frame 106 may be shared across the seat row 100. In some embodiments, the seat frame 106 includes spreaders 108 interconnected through transverse beams 110. The details and configuration of the seat frame 106 are not critical to the inventive aspects of the present disclosure. In some embodiments, each seat back 102 is configured with a video monitor 112 positioned above a tray table latch 114.

Each seat 102 is equipped with a tray table assembly 116 as discussed further below. In some embodiments, each tray table assembly 116 is rotatably attached to a pair of supports arms 118 further attached to the seat frame 106. In use, the support arms 118 serve to coordinate the rotational movement and positioning of the tray table assembly 116 relative to the seat back 104, such that the seat back recline angle does not impact the deployed position of the tray table assembly 116. When the tray table assembly 116 is fully stowed as shown in FIG. 1, the support arms 118 align generally along the sides of the seat back 104 and the tray table assembly 116 is positioned against the back of the seat back 104. When fully deployed, the tray table assembly 116 rotates away from the seat back 104 to a substantially horizontal position. The tray table assembly 116 according to the present disclosure is compatible for use with other tray table mechanisms including, but limited to, fore, aft, and lateral translation mechanisms, tray table expansion mechanisms, portable electronic device holders, etc.

Figure 2:
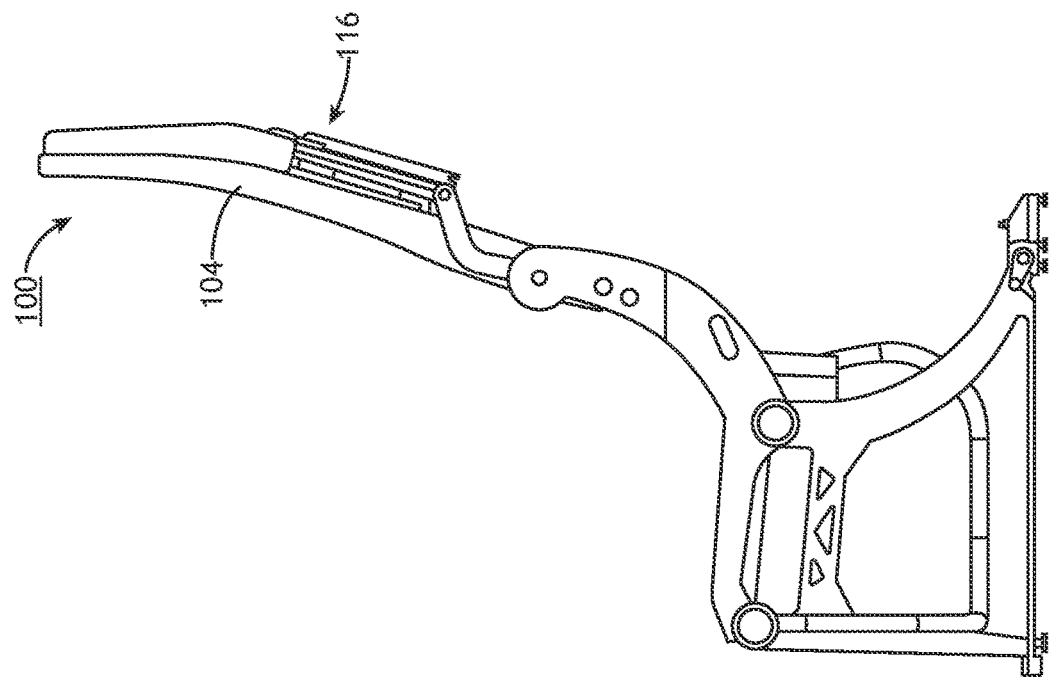
FIG. 2 is a side view of two longitudinally adjacent passenger seat each including a tray table assembly according to an embodiment of the present disclosure.
Figure 2:
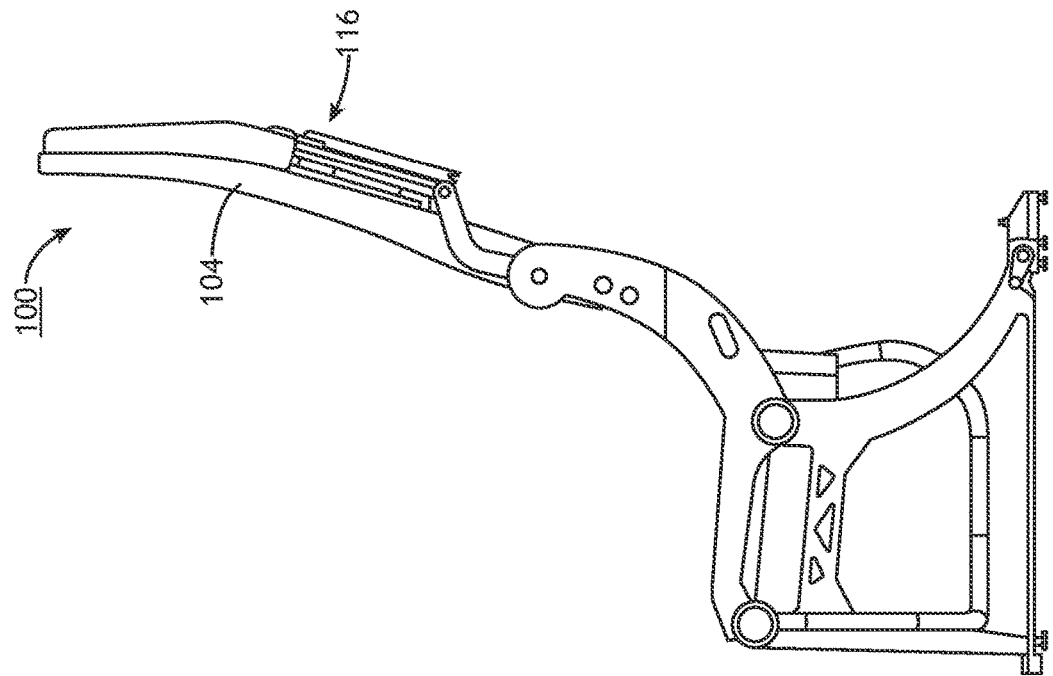

FIG. 2 illustrates a positional relationship of two seat rows 100 to show the position of the tray table assembly 116 when fully stowed. As shown, when fully stowed, the tray table assembly 116 is positioned about mid-height of the seat back 104 and is oriented substantially vertical. As such, a passenger seated in the aft seat row 100 (i.e., the right on the right) has a direct line of sight to the full front face of the tray table assembly 116. As discussed further below, this is important such that the contents stowed in the pouch 120 of the assembly are presented front and center to the passenger so that the passenger remembers to remove the contents before deplaning. When the tray table assembly 116 is deployed toward horizontal, the pouch may still remain accessible for use to the passenger although the pouch is positioned below the tray table. Considering the safety and stowage requirements for taxi, takeoff, and landing (TTOL), locating the pouch on the back or bottom of the tray table (depending on the tray table orientation) ensures that the contents within the pouch are fully visible to the passenger during the deplaning process.

Figure 3:
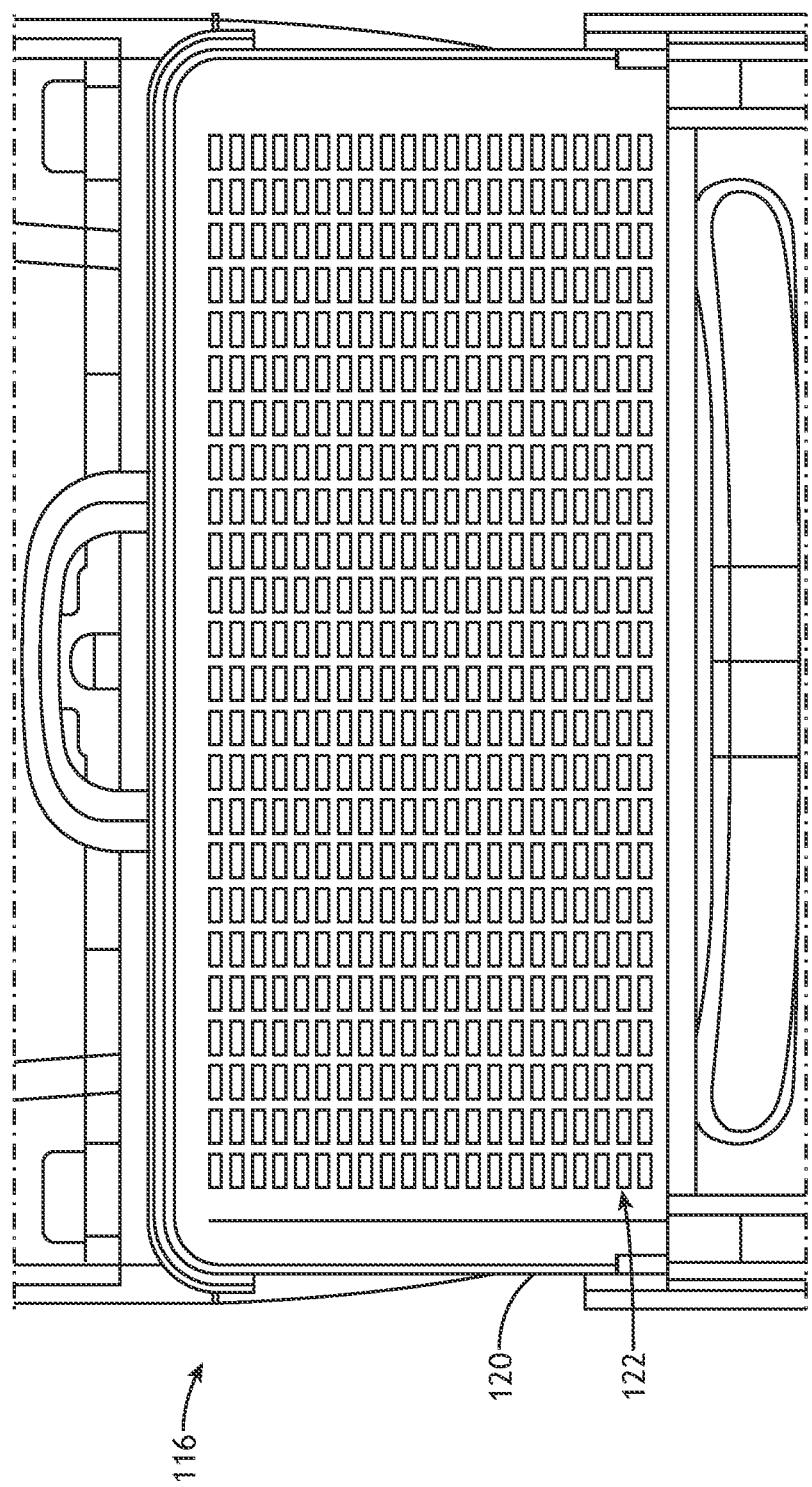
FIG. 3 is a back view of a portion of one of the passenger seats of FIG. 1, showing mesh material used in the construction of the integrated pouch.

FIG. 3 illustrates the front face or facing side of the tray table assembly 116. As discussed further below, the tray table assembly 116 includes a pouch 120 removably attached or attachable to a tray table. The pouch 120 includes a first or inner layer and a second or outer layer. As shown in FIG. 3, at least the second or outer layer 122 is configured to allow the contents within the pouch to be seen through the outer layer 122. In this regard, at least the outer layer 122 may be made from mesh material, translucent material, transparent material, combinations thereof, or the like such that the contents are visible to a passenger facing the stowed tray table assembly 116. To comply with safety requirements for a passenger seat, for example head strike area safety, at least a portion of the tray table assembly 116 may be constructed from a soft material, for instance neoprene rubber.

Figure 4:
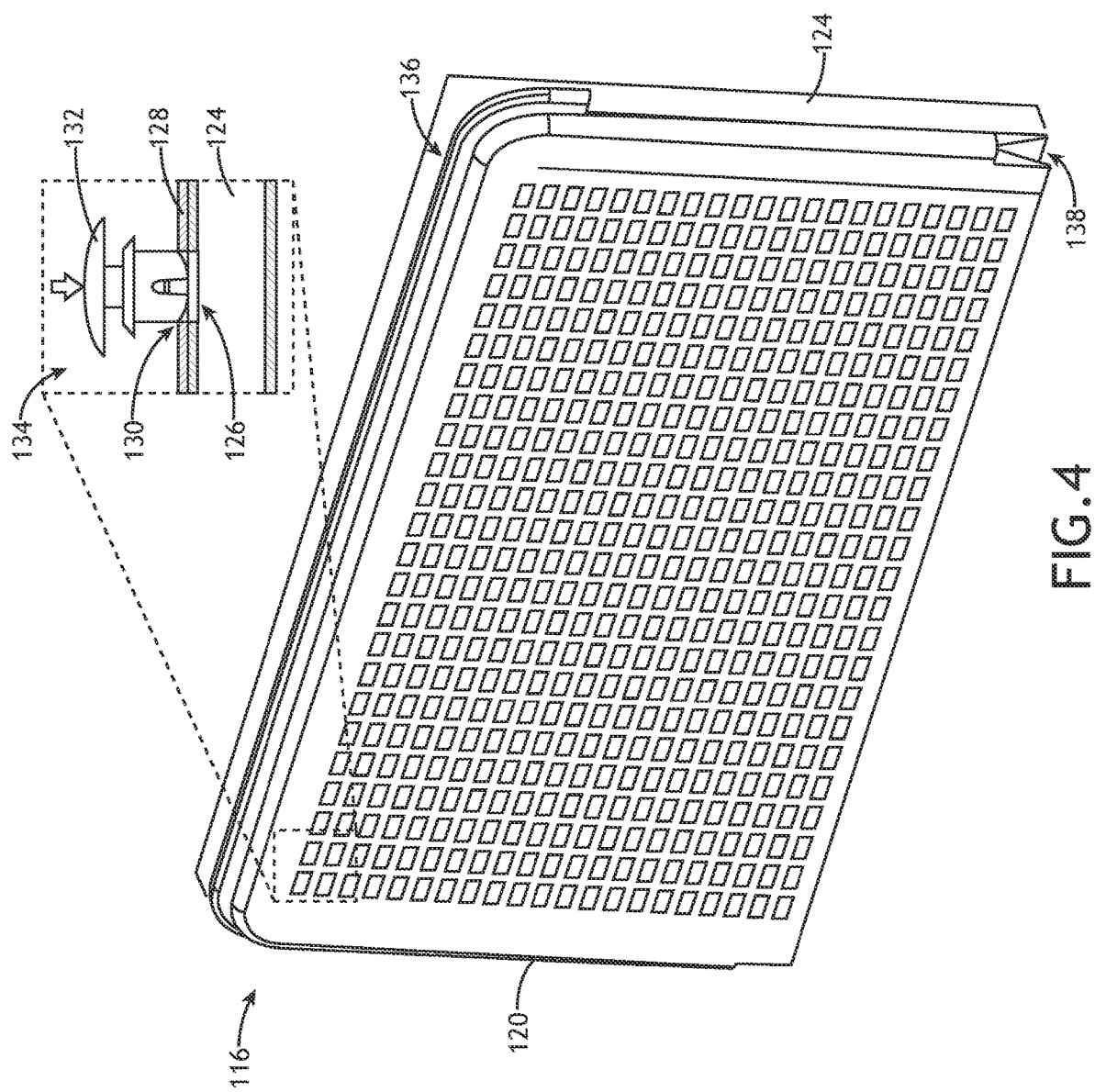
FIG. 4 is a perspective view of the pouch shown removed from the tray table.

FIG. 4 illustrates the tray table assembly 116 according to a preferred embodiment of the present disclosure. The tray table assembly 116 generally includes a tray table 124 and the pouch 120 removably attached to the tray table 124. The tray table 124 may be a constructed from rigid, durable, cleanable material such as plastic and composites. When fully stowed, the tray table 124 is positioned behind the pouch 120. When fully deployed, the tray table 124 is positioned above the pouch 120.

In some embodiments, the pouch 120 is removably attached to the tray table 124 using a plurality of removable fasteners. As shown in the detail of FIG. 4, the tray table 124 may include a plurality of openings 126 formed on the back of the tray table 124, with each opening 126 positioned proximate a corner of the tray table 124. The first or inner layer 128 of the pouch 120 includes a plurality of openings 130 formed through the inner layer 128, wherein the plurality of openings 130 formed through the inner layer 128 correspond in number and position to the plurality of openings 126 formed through the back of the tray table 124. In some embodiments, the removable fasteners are rivets 132, for instance plastic rivets, wherein each rivet 132 is received through one of the plurality of openings 130 formed through the inner layer 128 and the corresponding one of the plurality of openings 126 formed through the back of the tray table 124. To hide the rivets 132 from view, yet make them accessible, the rivets 132 may be accessed from within the interior space 134.

The tray table 124 has a front, a back, a top, a bottom, and opposing lateral sides. The tray table 124 may have any shape, for instance rectangular. The pouch 120 also has a front, a back, a top, a bottom and opposing lateral sides. In some embodiments, the tray table 124 and the pouch 120 are similar in size such that the pouch covers substantially all of the bottom of the tray table 124 to maximize stowage potential. The back of the pouch 120 is formed by the inner layer 120 which is positioned against the back of the tray table 124. The front of the pouch 120 is formed by the outer layer 122 which is positioned against the inner layer 128. The interior space is formed between the inner and outer layers 128, 122. In some embodiments, the top of the pouch 120 is formed by a closeable opening 136. In use, the closeable opening 136 maintains the contents within the interior space 134 as the tray table 124 is rotated between stowed and deployed and during turbulent conditions. In some embodiments, the bottom of the pouch is formed by an expandable fold 138. In use, the expandable fold 138 allows the interior space to expand depending on the amount and size of the contents. The expandable fold 138 further allows the outer layer 122 to be pulled apart from the inner layer 128 to access, insert, and remove the rivets 132.

Figure 5:
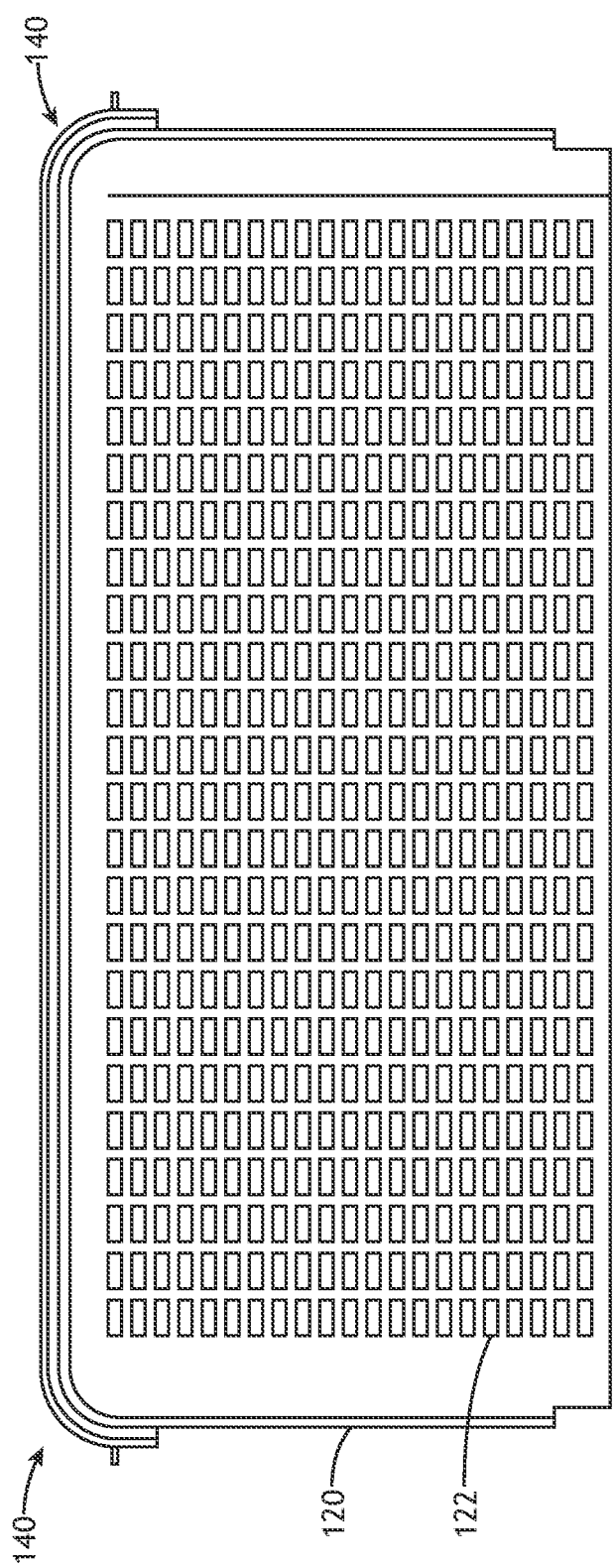
FIG. 5 is a front view of the pouch.
Figure 7:
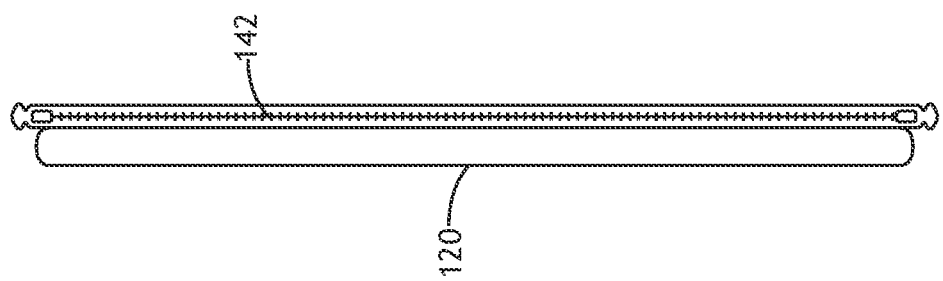
FIG. 7 is a top view of the pouch.
Figure 6:
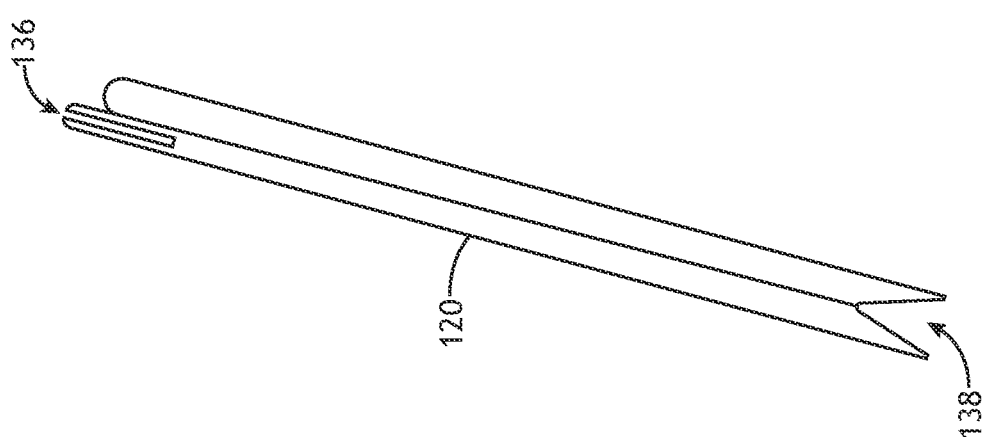
FIG. 6 is a side view of the pouch.

FIG. 5 illustrates a particular mesh outer layer 122 and curvature at the top of the pouch 120. In some embodiments, the top includes rounded corners 140. In some embodiments, the rounded corners 140 may be configured as corner covers configured to cover the corners of the tray table. FIGS. 6 and 7 further illustrate the shape of the pouch 120, and more particularly, the configurations of the closeable top opening 136 and the expandable fold 138. In some embodiments, the top opening may be a zippered opening 142 extending substantially the length of the top of the pouch 120.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed:

1. A tray table assembly, comprising:
a tray table having a front, a back, a top, a bottom, and opposing lateral sides, the tray table configured to stow against a seat back and deploy away from the seat back; and
a pouch removably attached to the back of the tray table by a plurality of removable fasteners, the pouch having a front, a back, a top, a bottom and opposing lateral sides;
wherein:
the back of the pouch is formed by a first layer positioned against the back of the tray table;
the front of the pouch is formed by a second layer positioned against the first layer;
an interior space is formed between the first layer and the second layer;
the top of the pouch is formed by a closeable opening;
the bottom of the pouch is formed by an expandable fold;
the tray table includes a plurality of openings formed on the back of the tray table, each opening positioned proximate a corner of the tray table;
the first layer of the pouch includes a plurality of openings formed through the first layer, wherein the plurality of openings formed through the first layer correspond in number and position to the plurality of openings formed through the back of the tray table; and
the plurality of removable fasteners are rivets, each rivet received through one of the plurality of openings formed through the first layer and the corresponding one of the plurality of openings formed through the back of the tray table.

2. The tray table assembly according to claim 1, wherein the second layer comprises mesh such that contents in the interior space are visible through the second layer.

3. The tray table assembly according to claim 1, wherein the top of the pouch includes a zippered opening.

4. The tray table assembly according to claim 1, wherein the top of the pouch comprises corner covers positioned over respective top corners of the tray table.

5. The tray table assembly according to claim 1, wherein at least some of the pouch is made from neoprene rubber.

6. The tray table assembly according to claim 1, wherein the tray table and the pouch are substantially equally sized.

7. The tray table assembly according to claim 1, wherein the second layer comprises a flexible interior portion and a rigid border.

8. The tray table assembly according to claim 1, wherein the second layer is translucent or transparent such that contents in the interior space are visible through the second layer.

9. A pouch configured to be removably attached to a tray table having a front, a back, a top, a bottom, and opposing lateral sides, the tray table configured to stow against a seat back and deploy away from the seat back, the pouch comprising:
a front, a back, a top, a bottom and opposing lateral sides;
wherein:
the back of the pouch is formed by a first layer configured to be positioned against the back of the tray table;
the front of the pouch is formed by a second layer positioned against the first layer;

an interior space is formed between the first layer and the second layer;

the top of the pouch is formed by a closeable opening;

the bottom of the pouch is formed by an expandable fold;

the first layer of the pouch includes a plurality of openings formed through the first layer, wherein the plurality of openings formed through the first layer correspond in number and position to a plurality of openings formed through the back of the tray table; and the plurality of removable fasteners are rivets, each rivet received through one of the plurality of openings formed through the first layer and configured to be received through a corresponding one of the plurality of openings formed through the back of the tray table.

10. The pouch according to claim 9, wherein the second layer comprises mesh such that contents in the interior space are visible through the second layer.

11. The pouch according to claim 9, wherein the top of the pouch includes a zippered opening.

12. The pouch according to claim 9, wherein the top of the pouch comprises corner covers configured to be positioned over respective top corners of the tray table.

13. The pouch according to claim 9, wherein the pouch comprises neoprene rubber.

14. The pouch according to claim 9, wherein the second layer comprises a flexible interior portion and a rigid border.

* * * * *